(12) United States Patent
Cortez et al.

(10) Patent No.: US 7,242,679 B1
(45) Date of Patent: Jul. 10, 2007

(54) SCHEME FOR ROUTING CIRCUITS WITH DYNAMIC SELF-ADJUSTING LINK WEIGHTS IN A NETWORK

(75) Inventors: Bruce Gilbert Cortez, Marlboro, NJ (US); Sanja Durinovic-Johri, Aberdeen, NJ (US); Pravin Kumar Johri, Aberdeen, NJ (US); James H. King, Red Bank, NJ (US)

(73) Assignee: AT&T Corp., New York, NY (US)

( * ) Notice: Subject to any disclaimer, the term of this patent is extended or adjusted under 35 U.S.C. 154(b) by 1008 days.

(21) Appl. No.: 10/281,750

(22) Filed: Oct. 28, 2002

(51) Int. Cl.
*H04L 12/28* (2006.01)
(52) U.S. Cl. .................................................... 370/351
(58) Field of Classification Search ................ 370/351, 370/352, 389, 395.1, 396, 397, 395.21, 395.41, 370/395.42, 400, 408; 709/223–226
See application file for complete search history.

(56) References Cited

U.S. PATENT DOCUMENTS

| | | | | |
|---|---|---|---|---|
| 5,289,462 A | * | 2/1994 | Ahmadi et al. | 370/232 |
| 5,687,167 A | * | 11/1997 | Bertin et al. | 370/254 |
| 5,909,443 A | * | 6/1999 | Fichou et al. | 370/412 |
| 5,940,372 A | * | 8/1999 | Bertin et al. | 370/238 |
| 6,400,687 B1 | * | 6/2002 | Davison et al. | 370/236 |
| 6,829,347 B1 | * | 12/2004 | Odiaka | 379/220.01 |

\* cited by examiner

*Primary Examiner*—Dmitry Levitan

(57) ABSTRACT

The present invention relates generally to routing of circuits in a network. More particularly, the invention encompasses a method and an apparatus for routing circuits using dynamic self-adjusting link weights within a network. The invention further includes multiple schemes for routing circuits with dynamic self-adjusting link weights in a SCN (Switched Communication Network). The network could consist of optical, ATM, FR, or IP/MPLS switches and cross-connects.

8 Claims, 4 Drawing Sheets

FIG. 3A

| LINK | ADMIN wt | BW | AVAIL BW |
|------|----------|-----|----------|
| 201  | 200      | 96  | 10       |
| 202  | 300      | 96  | 15       |
| 203  | 250      | 144 | 116      |
| 204  | 350      | 144 | 106      |
| 205  | 200      | 48  | 42       |
| 206  | 350      | 48  | 36       |
| 207  | 250      | 96  | 56       |

FIG. 3B

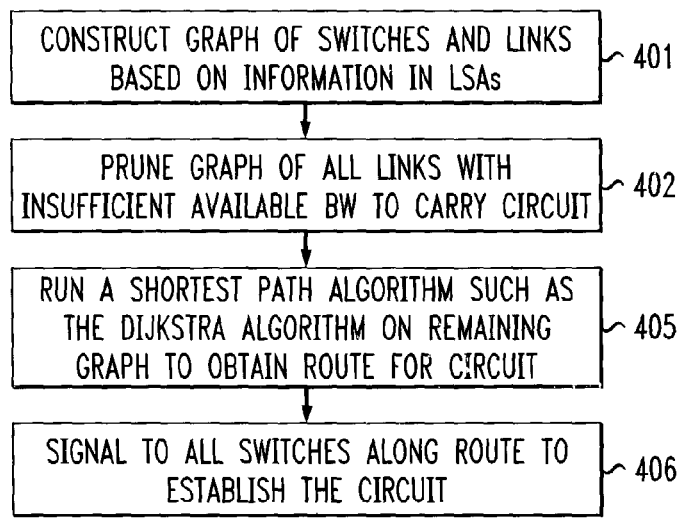

401 — CONSTRUCT GRAPH OF SWITCHES AND LINKS BASED ON INFORMATION IN LSAs

402 — PRUNE GRAPH OF ALL LINKS WITH INSUFFICIENT AVAILABLE BW TO CARRY CIRCUIT

405 — RUN A SHORTEST PATH ALGORITHM SUCH AS THE DIJKSTRA ALGORITHM ON REMAINING GRAPH TO OBTAIN ROUTE FOR CIRCUIT

406 — SIGNAL TO ALL SWITCHES ALONG ROUTE TO ESTABLISH THE CIRCUIT

FIG. 3C

| ROUTE | LINKS IN ROUTE | SWITCHES IN ROUTE | CUM. ADMIN. wt (LENGTH) |
|-------|----------------|-------------------|-------------------------|
| 1     | 201, 202       | 102               | 500                     |
| 2     | 203, 204       | 106               | 600                     |
| 3     | 205, 206, 207  | 104, 105          | 800                     |

| LINK | ADMIN wt | BW | AVAIL BW | U | Y | NEW wt |
|---|---|---|---|---|---|---|
| 201 | 200 | 96 | 10 | 0.90 | 0.40 | 279 |
| 202 | 300 | 96 | 15 | 0.84 | 0.34 | 403 |
| 203 | 250 | 144 | 116 | 0.19 | 0.00 | 250 |
| 204 | 350 | 144 | 106 | 0.26 | 0.00 | 350 |
| 205 | 200 | 48 | 42 | 0.13 | 0.00 | 200 |
| 206 | 350 | 48 | 36 | 0.25 | 0.00 | 350 |
| 207 | 250 | 96 | 56 | 0.42 | 0.00 | 250 |

| ROUTE | LINKS IN ROUTE | SWITCHES IN ROUTE | CUM. ADMIN. wt | CUM. NEW wt | |
|---|---|---|---|---|---|
| 1 | 201, 202 | 102 | 500 | 682 | |
| 2 | 203, 204 | 106 | 600 | 600 | ← NEW BEST ROUTE |
| 3 | 205, 206, 207 | 104, 105 | 800 | 800 | |

FIG. 6A

| LINK | ADMIN wt | BW | AVAIL BW | U | Z | NEW wt |
|---|---|---|---|---|---|---|
| 201 | 200 | 96 | 10 | 0.90 | 20 | 180 |
| 202 | 300 | 96 | 15 | 0.84 | 30 | 270 |
| 203 | 250 | 144 | 116 | 0.19 | 75 | 175 |
| 204 | 350 | 144 | 106 | 0.26 | 105 | 245 |
| 205 | 200 | 48 | 42 | 0.13 | 60 | 140 |
| 206 | 350 | 48 | 36 | 0.25 | 72 | 278 |
| 207 | 250 | 96 | 56 | 0.42 | 75 | 175 |

FIG. 6B

| ROUTE | LINKS IN ROUTE | SWITCHES IN ROUTE | CUM. ADMIN. wt | CUM. NEW wt | |
|---|---|---|---|---|---|
| 1 | 201, 202 | 102 | 500 | 450 | NEW |
| 2 | 203, 204 | 106 | 600 | 420 ← | BEST ROUTE |
| 3 | 205, 206, 207 | 104, 105 | 800 | 593 | |

US 7,242,679 B1

SCHEME FOR ROUTING CIRCUITS WITH DYNAMIC SELF-ADJUSTING LINK WEIGHTS IN A NETWORK

FIELD OF THE INVENTION

The present invention relates generally to routing of circuits in a network. More particularly, the invention encompasses a method and an apparatus for routing circuits using dynamic self-adjusting link weights within a network. The invention further includes multiple schemes for routing circuits with dynamic self-adjusting link weights in a SCN (Switched Communication Network). The network could consist of optical, ATM, FR, or IP/MPLS switches and cross-connects.

BACKGROUND INFORMATION

The problems with communication congestion, such as decrease in available bandwidths, failure and restoration of communication routes are all well known in the art. There are many solutions that have been proposed and some have been implemented. For example, one solution calls for an external method to periodically analyze the static link weights and adjust these link weights, through provisioning, to modify the path selection process.

Also, the current routing protocols always pick the shortest—that is, least cumulative (static)—link weight path with available capacity. Communication ties are typically broken in arbitrary but fixed order. Thus, if there are two (diverse) paths, say between New York and Washington, D.C., one of these will be consistently chosen over the other and all service will ride on this path. The other or the second path will be designated as the restoration path and restoration capacity will be maintained in the network along this path. A failure in the first path would take out all the circuits from New York to Washington, D.C. However, if some of these circuits were on the second path, the failure would have impacted fewer circuits. Furthermore, this also leads to a highly imbalanced network.

This invention overcomes the problems of the prior art. The invention is a dynamic method and apparatus for adjusting link weights so that the routing of circuits will adapt as links fill up in the Switched Communication Network. This will lead to a more balanced network and fewer circuits would be affected by individual network failures, resulting in better restoration performance.

PURPOSES AND SUMMARY OF THE INVENTION

The invention is a novel method and an apparatus for routing circuits using dynamic self-adjusting link weights within a network.

Therefore, one purpose of this invention is to route circuits using dynamic self-adjusting link weights within a network.

Another purpose of this invention is to provide restoration in a very efficient and economical manner.

Still another purpose of this invention is to create a highly balanced network.

Yet another purpose of this invention is to utilize all the links within the network.

Still yet another purpose of this invention is to monitor the available bandwidth of the links in the network and, when the bandwidth falls below a specific threshold, to implement this invention.

Therefore, in one aspect this invention comprises a method for routing circuits using dynamic self-adjusting link weights within a network, comprising the steps of:

(a) calculating a new "administrative" weight for each link in a network based on provisioned administrative weight of said link and at least one additional parameter, and (b) calculating the route of the circuit using the new "administrative" weight.

In another aspect this invention comprises a method for routing circuits using dynamic self-adjusting link weights within a network, comprising the steps of:

(a) calculating a new "administrative" weight for each link in a network based on provisioned administrative weight of said link, wherein the new "administrative" weight of said link is different than the provisioned administrative weight of said link, and (b) using the new "administrative" weight to calculate the route for the circuit.

In yet another aspect this invention comprises an apparatus for routing circuits using dynamic self-adjusting link weights within a network, comprising:

administrative weight of said link and at least one additional parameter, and (b) means for using the new "administrative" weight to calculate the route for the circuit.

In still another aspect this invention comprises an apparatus for routing circuits using dynamic self-adjusting link weights within a network, comprising:

(a) means for calculating a new "administrative" weight for each link in a network based on provisioned administrative weight of said link, wherein the new "administrative" weight of said link is different than the provisioned administrative weight of said link, and (b) means for using the new "administrative" weight to calculate the route for the circuit.

In still yet another aspect this invention comprises a program storage device readable by machine, tangibly embodying a program of instructions executable by the machine to perform method steps for routing circuits using dynamic self-adjusting link weights within a network, the method steps comprising:

(a) calculating a new "administrative" weight for each link in a network based on provisioned administrative weight of said link and at least one additional parameter, and (b) calculating the route of the circuit using the new "administrative" weight.

In yet another aspect this invention comprises a program storage device readable by machine, tangibly embodying a program of instructions executable by the machine to perform method steps for routing circuits using dynamic self-adjusting link weights within a network, the method steps comprising:

(a) calculating a new "administrative" weight for each link in a network based on provisioned administrative weight of said link, wherein the new "administrative" weight of said link is different than the provisioned administrative weight of said link, and (b) using the new "administrative" weight to calculate the route for the circuit.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the draw

FIG. 3A uses the exemplary network of FIG. 1 and provides characteristics for all the links and switches.

FIG. 3B is an exemplary flow diagram to illustrate the circuit establishment process of the prior art.

FIG. 3C illustrates the routing scheme results of the prior art.

FIGS. 6A and 6B illustrate the present invention using another method of the invention.

DETAILED DESCRIPTION

The present invention makes the link weight used in path calculations a function of the (static) link weight and the total and the currently available capacities of the link. All these three pieces of information are either already contained in link-state advertisements used by known routing protocols, or can be obtained by simple enhancements. This invention takes advantage of the fact that as the available capacity of the link weight changes (increases or decreases), the paths using this link become less desirable. The available capacity could be expressed as a percentage of the total capacity of the link. This will force the shortest path to become longer as more services are provisioned and will cause (previously) longer paths to become more attractive and to be eventually used, resulting in a better-balanced network.

Figures 1, 2:
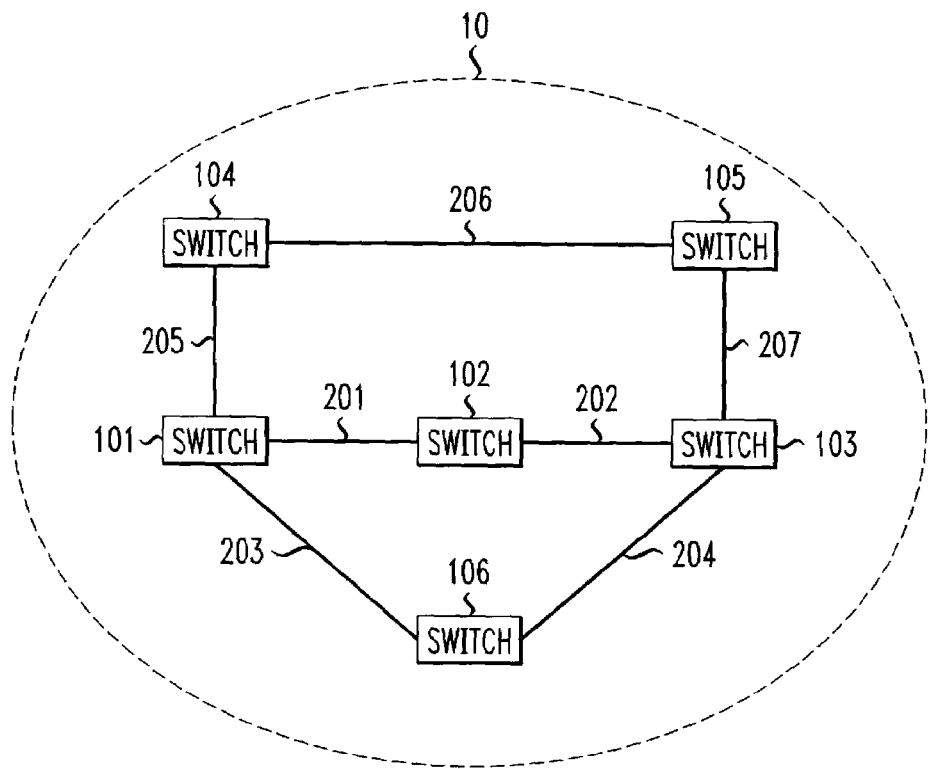
- FIG. 1 is an exemplary network which is used to illustrate the present invention.
FIG. 2 illustrates an example of a link between two switches and their characteristics.

FIG. 1 is an exemplary switch setting up the circuit 10 which is used to illustrate the present invention. The switch setting up the circuit 10 has a plurality of switches (SW) 101–106 and a plurality of point-to-point communication links 201–207, as more clearly illustrated in FIG. 1. In a typical switch setting-up the circuit 10, switches 101–106 are connected with point-to-point communication links 201–207—for example, OC48 (Optical Carrier level 48), OC12, OC3, DS3 communication links, to name a few. One can also have multiple links between a pair of switches (not shown). It is preferred that each link 201–207 is bi-directional, and with potentially different characteristics in each direction. For example, each link could have different bandwidth (BW) and administrative weight between each direction. For the sake of simplicity, the invention will be illustrated assuming that all the links have the same characteristics in either direction. Switches 101–106 can also automatically discover network and set up circuits using known link-state routing and signaling protocols. Examples of such switches are optical switches, ATM switches, FR switches, and IP/MPLS routers, and examples of protocols are OSPF (Open Shortest Path First), PNNI (Private Network-to-Network Interface), MPLS (Multi-Protocol Label Switching), to name a few, or the switches can be provisioned with network information. Multiple links can also be grouped into an "aggregated link" to ease burden of link-state protocol. Circuits are established between a pair of switches and the circuit could traverse multiple switches in between. The (service) route of the circuit is the set of links (and switches) on which it is set up.

FIG. 2 illustrates an example of a link between two switches—for example, 101 and 102—and their characteristics. For ease of understanding, the rest of the invention will be described in terms of optical switches and OC48 links between switches. The point-to-point communication link 201 connects switch 101 and switch 102 to each other. There may be other parallel links and/or switches between switch 101 and switch 102, and/or between switches 103–106 and links 202–207; but for the ease of understanding the invention they are not being discussed. Suffice it to say that this invention equally applies to those links and/or switches.

For the purpose of understanding this invention, let us assume that the link 201 comprises two component OC48 lines; therefore the bandwidth (BW) in the direction from switch 101 to switch 102 would be 96 STS1 (Synchronous Transport Signal level 1) slots (2×OC48). The bandwidth in the direction from switch 201 to switch 101 would be 96 STS1 slots (2×OC48). Let us also assume that the administrative weights in the direction from switch 101 to switch 102 total 200, and the administrative weights in the direction from switch 102 to switch 101 total 200. Let us also assume that the available bandwidth in the direction from switch 101 to switch 102 would be 10 STS1 slots, and the available bandwidth in the direction from switch 102 to switch 101 would be 10 STS1 slots. This also implies that the existing circuits are using 86 STS1 slots (96−10).

Administrative weights are typically provisioned by a network administrator for each link in the two end switches when the link is turned up. The administrative weights reflect the cost of the link and are typically a function of the length of the link. The administrative weight can also be changed (by the network administrator) while the link is operational. Furthermore, the available bandwidth on a link depends on the total bandwidth of the link minus the bandwidth used by the circuits provisioned on the link.

Now referring to FIGS. 3A, 3B and 3C, where FIG. 3A uses the exemplary network of FIG. 1 and provides characteristics for all the links and switches. For the purposes of illustration, let us assume that the administrative weights, bandwidth and the available bandwidth for each of the links are as shown in FIG. 3A. It should be appreciated that each switch number 101–106 keeps track of the available bandwidth of all its links. Each of the switch advertises this information (along with the total bandwidth, administrative weights, etc.) in link-state advertisements (LSAs). This is a standard practice and is used by most, if not all, of the routing protocols known in the art. Each switch number 101–106 collects LSAs from all other switches and, on the basis of the information therein, compiles information such as that shown in FIG. 3A. The table shown in FIG. 3A is for illustrative purposes only, and the exact method could vary from vendor to vendor, and protocol to protocol. The standard process of establishing a new circuit is to first find the shortest route for the circuit. Here the term "shortest" is defined as the least cumulative administrative weights of the links in the route. The route must also have sufficient available bandwidth for the circuit.

FIG. 3B is an exemplary flow diagram to illustrate the circuit establishment process of the prior art. At step 401 the switch setting up the circuit 10 constructs a graph of switches and links based on the information in LSAs. At step 402 the switch setting up the circuit 10 prunes the graph of all links with insufficient available bandwidth to carry the circuit. Steps 401 and 402 can be combined into a single step. Also, step 402 can be performed before step 401. At step 405 the switch setting up the circuit 10 runs a shortest path algorithm, such as the Dijkstra algorithm, on the remaining graph to obtain a route for circuit. At step 406 the switch setting up the circuit 10 signals to all the switches along the route or links to establish the circuit. For the sake of simplicity, this circuit establishment process does not show what is done if any of the steps cannot be performed; however, those steps are all well known in the prior art. It should be appreciated that step 406 is a complex step and may involve multiple activities.

FIG. 3C illustrates the routing scheme results of the prior art obtained from FIGS. 3A and 3B. Therefore, based on the administrative weights in FIG. 3A, there are three routes for a circuit from switch 101 to switch 103. The length of a route is the sum of the administrative weights of the links in the route. The three different routes from switch 101 to switch 103 are illustrated in FIG. 3C. Now when the circuit establishment process illustrated in FIG. 3B is utilized, then for an STS1 or STS3 circuit, Route 1 will be chosen. However, for an STS12 circuit, Route 2 will be chosen as link 201 will be pruned in step 402, due to insufficient available bandwidth to carry the circuit.

It is well known that the aim of capacity planning is to provision adequate network capacity over time to accommodate demand for circuits in the future. This is an ongoing process, and the gist of the process is to estimate needed capacity based on demand forecasts or on estimates of how fast capacity is being consumed. The exact process is not relevant to this invention, except for the fact that capacity is continually augmented as it is used up.

For example, the demand forecast may be for an equivalent of 20 STS1s in the near future on link 201. This clearly exceeds the available bandwidth on link 201 of 10 STS1s. Consequently, the size of link 201 has to be augmented by adding another OC48 line to it.

Furthermore, in case of a network failure of a link or switch, circuits that include the failed link/switch in their routes also fail and have to be restored. The process is to find a new (restoration) route for each failed circuit that circumvents the failed portion of the network. The switches will transmit information of the failure using known routing protocols. The failed links and switches are deleted from the network graph and a new route is calculated using the process in FIG. 3B. It is also important to note that restoration is a serial process. Thus, the larger the number of failed circuits in a switch, the longer it takes to restore all the circuits.

Most networks that are in use also have requirements that certain classes of circuits must be restored in the event of network failures. Thus, to plan for a possible failure of link—for example, link 203—alternate routes have to be calculated for all circuits that ride on link 203 and adequate restoration capacity must be provisioned on the links that make up these routes.

For example, say that there are nine circuits on link 203 with a total bandwidth of STS 28. Link 203 has three component OC48 lines for a total bandwidth of STS 144, leaving STS 116 as the available bandwidth, as illustrated in FIG. 3A. Let us say that the alternate routes for these circuits are such that six circuits (bandwidth=STS 21) go over link 201 and three circuits (bandwidth=STS 7) go over link 205. There may be other links in the alternate routes as well. Thus, the restoration capacity planning process needs to provide for spare capacity on link 201 of at least STS 21 and on link 205 of at least STS 7. The restoration capacity will be in addition to capacity provided for future service demands. Thus planning for restoration capacity is a complicated process. The above example is a simplification of the actual process and has been used here for the purposes of illustration only. Also, it is not relevant to the invention what process and algorithms are employed for service and restoration capacity planning, except for the fact that spare network capacity is continually deployed in the network for future service demands and for restoration.

The current art of establishing new service circuits, restoring failed circuits, and for planning both the service and restoration capacity leads to unbalanced loading on the network. To illustrate this problem of the prior art, say that there is a high demand for circuits between switches 101 and 103 in the network. This demand comes over time. Using the process illustrated in FIG. 3B, the demand would initially be routed on the shortest route, which would be over links 201 and 202. As the capacity of links 201 and 202 gets used up, the capacity planning process augments the capacity of these links. In addition, the restoration capacity planning process requires some spare bandwidth on these links for restoring circuits on other routes. Additional circuits between switches 101 and 103, in most, if not all, cases would get routed on the shortest route, which would be link 201 and link 202, as there generally is sufficient spare capacity on these links. In order to plan for the restoration of these circuits, since they all ride on links 201 and 202, restoration capacity would be planned for on alternate routes. The two alternates routes are shown in FIG. 3C, as Route 2 and Route 3, and between them they must have sufficient spare capacity to restore all restorable circuits on link 201 and link 202. Since Route 2 is shorter than Route 3, it will be the preferred restoration route and the major portion of the restoration capacity will be allocated to this route resulting in (a) a lot of service demand on links 201 and 202, (b) a lot of spare restoration capacity on links 203 and 204, and (c) some restoration capacity on links 205, 206 and 207.

Now, if either of the links 201 or 202 fail, then all circuits between switches 101 and 103 will fail and all of the restorable circuits will have to be restored on alternate routes. This is not good from the point of view of restoration speed, as switches 101 and 103 will have a large number of circuits to restore all at once, and it will be longer before all circuits come up again. However, if some of these circuits were distributed onto Route 2 (links 203, 204), then there would be a better balanced situation in the network, and a failure of links 201 and 202 would affect fewer circuits, leading to significantly better restoration times. However, there are no automatic ways in the prior art to balance or distribute circuits between alternate routes. This is because the shortest route is always chosen in these methods. One of the avenues available to a network administrator would be to manually change the administrative weights of the links to make a previously longer route appear shorter in terms of the new administrative weights. This would be considered very risky as it would involve a lot of manual provisioning with unpredictable effects. However, this invention overcomes these and other problems of the prior art and provides an automatic way of adjusting administrative weights to better balance the network load.

Figures 4, 5A, 5B:
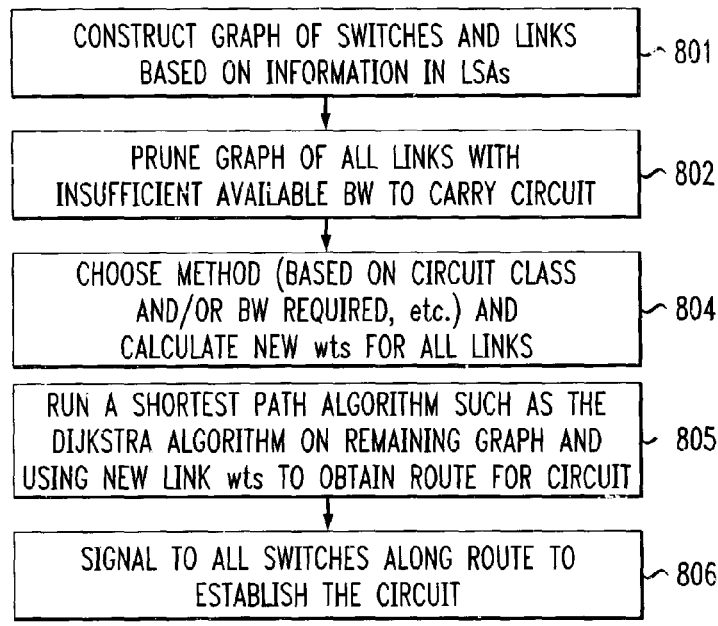
FIG. 4 is an exemplary flow diagram to illustrate the circuit establishment process with new weights using the present invention.
FIGS. 5A and 5B illustrate the present invention using a first method of the invention.

FIG. 4 is an exemplary flow diagram to illustrate the circuit establishment process with new weights using the present invention. At step 801 the switch setting up the circuit 10 constructs a graph of switches and links based on the information in LSAs. At step 802 the switch setting up the circuit 10 prunes the graph of all links with insufficient available bandwidth to carry the circuit. Steps 801 and 802 can be combined into a single step. Also, step 802 can be performed before step 801. At step 804 the network chooses a method based on circuit class and/or bandwidth requirements and calculates new weights for all the links. At step 805 the switch setting up the circuit 10 runs a shortest path algorithm, such as the Dijkstra algorithm, on the remaining graph and uses new link weights to obtain a route for the circuit. At step 806 the switch setting up the circuit 10 signals to all the switches along the route or links to establish the circuit. For the sake of simplicity, this circuit establishment process does not show what is done if any of the steps cannot be performed; however, those steps are all well known in the prior art. It should also be appreciated that step 806 is a complex step and may involve multiple activities.

This invention allows the network to calculate a new "administrative" weight for each link and to use the new "administrative" weights each time a route calculation is done. The new "administrative" weight for a link is basically based on the provisioned administrative weight of the link and other link characteristics, such as the bandwidth, available bandwidth, etc., and the circuit characteristics, such as class of circuit, bandwidth needed, etc.

FIGS. 5A and 5B illustrate the present invention using a first method of the invention, where:

$$\text{utilization}(U) = (\text{bandwidth} - \text{available bandwidth})/\text{bandwidth},$$

thus U (utilization) will be a fraction between 0 and 1.

Using the first method, the $$\text{New "administrative" weight} = \text{administrative weight} + Y^*\text{administrative weight}$$

where $Y = U - T$ if $U >$ or $= T$, and where $Y = 0$ if $U < T$.

And, where T (threshold) is a number between 0 and 1.

For the purposes of illustration let us say that T is set at 0.5 for each link, which is a threshold number to be set by a network administrator for each link. Using the information from FIG. 3A, the formulas of the first method, and a threshold of 0.5, FIG. 5A shows the new "administrative" weights, along with the utilization (U) and the variable Y for each of the links 201–207.

The cumulative new weight (length) for the three different routes from switch 101 to switch 103, using the first new weight method, are illustrated in FIG. 5B. As one can see in FIG. 5B, Route 2 has a cumulative new weight (length) of 600, which is now a shorter route than Route 1 which now has a cumulative new length (weight) of 682. This will cause new circuits between switches 101 and 103 to take Route 2 and avoid the situation where all circuits were taking Route 1. As more circuits take Route 2, the utilization of links on Route 2 will increase, causing their new weights to increase as well; and eventually Route 1 or another route will again be the best choice. Comparing FIG. 5B with FIG. 3C one can clearly see that the first method of this invention will make the new "administrative" weight of a link higher than the provisioned administrative weight as the utilization of the link increases above an arbitrarily pre-set threshold. For the purposes of illustration, the pre-set threshold for the first method was arbitrarily set at 0.5.

Thus, this invention provides an automatic way of balancing the load or the utilization of the links in the network. Using the new weights (lengths) obtained from the first method of this invention also provides an automatic way of making circuits take a slightly longer path (in terms of the provisioned administrative weights) when the utilization of the links in the shortest route becomes high. This invention can also be implemented based on the class of the circuit and/or the bandwidth needed. For example, new "administrative" weights may only be calculated for the less important class of basic circuits, but not for the more important class of premium circuits.

FIGS. 6A and 6B illustrate the present invention using another method of the invention, where:

$$\text{New "administrative" weight} = \text{administrative weight} - Z$$

where:

$Z = M^*$available bandwidth if, $M^*$available bandwidth $< V^*$administrative weight, and $Z = V^*$administrative weight if, $M^*$available bandwidth $>$ or $= V^*$administrative weight.

The multiplier (M) is a number, such as 2, and the threshold (V) is a pre-selected number between 0 and 1, such as 0.3.

For the purposes of illustration, let us say that the threshold V is set at 0.3 for each link, which is a threshold number to be set by a network administrator for each link, and the multiplier (M) is set at 2. Using the information from FIG. 3A, the formulas of the second method, and a threshold of 0.3, FIG. 6A shows the new "administrative" weights, along with the utilization (U) and the variable Z for each of the links 201–207.

The cumulative new weight (length) for the three different routes from switch 101 to switch 103, using the second new weight method, are illustrated in FIG. 6B. As one can see in FIG. 6B, Route 2 has a cumulative new weight (length) of 420, which is now a shorter route than Route 1 which now has a cumulative new length (weight) of 450. This will cause new circuits between switches 101 and 103 to take Route 2 and avoid the situation where all circuits were taking Route 1. As more circuits take Route 2, the utilization of links on Route 2 will increase, causing their new weights to increase as well. Eventually, Route 1 or another route will again be the best choice. Comparing FIG. 6B with FIG. 3C one can clearly see that the second method of this invention will make the new "administrative" weight lower or more attractive than the provisioned administrative weight as the product of the available bandwidth of the link and an arbitrary multiplier increases until an arbitrarily pre-set threshold is reached. For the purposes of illustration, the pre-set threshold for the second method was arbitrarily set at 0.3 times the provisioned administrative weight.

One can clearly see that the second method of this invention is also an automatic way of balancing the load or utilization of links in the network, like the first method.

This invention is applicable to other MPLS-based IP (Internet Protocol) networks and the traditional ATM and Frame Relay (FR) networks as well. This invention can also be used with any communication network with switches capable of establishing circuits—for example, Frame Relay switches, ATM switches, IP/MPLS routers, Optical switches, digital and optical cross-connects, to name a few.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for routing circuits using dynamic self-adjusting link weights within a network, comprising the steps of:
   (a) calculating a new "administrative" weight for each link in a network based on a provisioned administrative weight of said link and at least one additional parameter, and
   (b) calculating a route of the circuit using the new "administrative" weight,
   wherein the new "administrative" weight of said link is calculated using the formula:

$$\text{utilization}(U) = (\text{bandwidth} - \text{available bandwidth})/\text{bandwidth},$$

and $$\text{the new "administrative" weight} = \text{administrative weight} + Y*\text{administrative weight}$$

where $Y = U-T$ if $U >$ or $= T$, and
   where $Y = 0$ if $U < T$
   and wherein the T (threshold) is a number between 0 and 1.

2. The method of claim 1, wherein the U (utilization) is a fraction between 0 and 1.

3. A method for routing circuits using dynamic self-adjusting link weights within a network, comprising the steps of:
   (a) calculating a new "administrative" weight for each link in a network based on a provisioned administrative weight of said link and at least one additional parameter, and
   (b) calculating a route of the circuit using the new "administrative" weight,
   wherein the new "administrative" weight of said link is calculated using the formula:

$$\text{new "administrative" weight} = \text{administrative weight} - Z$$

where:
   $Z = M*\text{available bandwidth}$ if, $M*\text{available bandwidth} < V*\text{administrative weight}$, and
   $Z = V*\text{administrative weight}$ if, $M*\text{available bandwidth} >$ or $- V*\text{administrative weight}$, and
   where the M (multiplier) is a positive number and the V (threshold) is a number between 0 and 1.

4. An apparatus, comprising:
   (a) means for calculating a new "administrative" weight for each link of a plurality of links in a network based on a provisioned administrative weight of said link and at least one additional parameter, and
   (b) means for using the new "administrative" weight to calculate the a route for the circuit,
   wherein the means for calculating the new "administrative" weight for said link uses the formula:

$$\text{utilization}(U) = (\text{bandwidth} - \text{available bandwidth})/\text{bandwidth},$$

and $$\text{the new "administrative" weight} = \text{administrative weight} + Y*\text{administrative weight}$$

where $Y = U-T$ if $U >$ or $= T$, and
   where $Y = 0$ if $U < T$
   and wherein the T (threshold) is a number between 0 and 1.

5. The apparatus of claim 4, wherein the U (utilization) is a fraction between 0 and 1.

6. An apparatus, comprising:
   (a) means for calculating a new "administrative" weight for each link of a plurality of links in a network based on a provisioned administrative weight of said link and at least one additional parameter, and
   (b) means for using the new "administrative" weight to calculate the a route for the circuit,
   wherein the means for calculating the new "administrative" weight for said link uses the formula:

$$\text{new "administrative" weight} = \text{administrative weight} - Z$$

where:
   $Z = M*\text{available bandwidth}$ if, $M*\text{available bandwidth} < V*\text{administrative weight}$, and
   $Z = V*\text{administrative weight}$ if, $M*\text{available bandwidth} >$ or $= V*\text{administrative weight}$ and
   where the M (multiplier) is a positive number and the V (threshold) is a number between 0 and 1.

7. A method for routing a circuit within a network, the method comprising
   (a) calculating new weights for links in the network, the new weight for a link being based on a previously established weight for that link and at least one additional parameter, and
   (b) determining a route for the circuit using the new weights calculated for at least ones of said links,
   wherein the previously established weight is a provisioned administrative weight of said link and wherein the new weight of said link is calculated using the formula:

$$\text{utilization}(U) = (\text{bandwidth} - \text{available bandwidth})/\text{bandwidth},$$

and $$\text{the new weight} = \text{administrative weight} + Y*\text{administrative weight}$$

where $Y = U-T$ if $U >$ or $= T$, and
   where $Y = 0$ if $U < T$
   wherein T is a number between 0 and 1.

8. A method for routing a circuit within a network, the method comprising
   (a) calculating new weights for links in the network, the new weight for a link being based on a previously established weight for that link and at least one additional parameter, and
   (b) determining a route for the circuit using the new weights calculated for at least ones of said links,
   wherein the previously established weight is a provisioned administrative weight of said link and wherein the new weight of said link is calculated using the formula:

$$\text{new weight} = \text{administrative weight} - Z$$

where:
   $Z = M*\text{available bandwidth}$ if, $M*\text{available bandwidth} < V*\text{administrative weight}$, and
   $Z = V*\text{administrative weight}$ if, $M*\text{available bandwidth} >$ or $= V*\text{administrative weight}$ and
   where the M (multiplier) is a positive number and the V (threshold) is a number between 0 and 1.

* * * * *